United States Patent [19] [11] 3,922,037
Yamada et al. [45] Nov. 25, 1975

[54] ROTARY MEMBER HOLDING ASSEMBLY
[76] Inventors: Teruo Yamada, 17-17, 2-chome Azusawa; Takeo Yamada, 63,4-chome Maeno-cho; Tsunehiko Uchisaka, 17-1,1-chome Naka-cho, all of Tokyo, Japan
[22] Filed: June 10, 1974
[21] Appl. No.: 477,868

Related U.S. Application Data
[63] Continuation-in-part of Ser. No. 296,065, July 5, 1972, abandoned.

[30] Foreign Application Priority Data
June 30, 1971 Japan.............................. 46-047898
June 30, 1971 Japan.............................. 46-047899
July 8, 1971 Japan.............................. 46-050471
Dec. 13, 1971 Japan.............................. 46-100913
Dec. 27, 1971 Japan.............................. 46-153
May 6, 1972 Japan.............................. 47-44845

[52] U.S. Cl.................................. 308/6 B; 308/201
[51] Int. Cl.²......................................... F16C 21/00
[58] Field of Search......... 308/189 R, 201, 6 B, 4 C

[56] References Cited
UNITED STATES PATENTS
2,875,005 2/1959 Blazek et al........................ 308/201
3,051,534 8/1962 Kohler et al.................... 308/201 X
3,239,282 3/1966 Schroll et al....................... 308/6 B
3,253,868 5/1966 Danly................................. 308/6 B
3,469,894 9/1969 Stamm........................... 308/201 X
3,743,369 7/1973 Langstrom......................... 308/201

*Primary Examiner*—M. Henson Wood, Jr.
*Assistant Examiner*—Michael Mar
*Attorney, Agent, or Firm*—Frank J. Jordan

[57] ABSTRACT

A rotary member holding assembly includes an inner cylindrical member disposed in abutting relationship within an outer cylindrical member. Each cylindrical member has a plurality of aligned through holes for accommodating rotary members such as ball bearings. In order to retain the rotary members in place, the outer cylindrical member has ball-retaining flanges concentrically disposed about the spaced openings in the outer cylindrical member and the inner cylinder member has ball-retaining rings concentrically disposed within the spaced openings in the inner cylindrical member.

3 Claims, 11 Drawing Figures

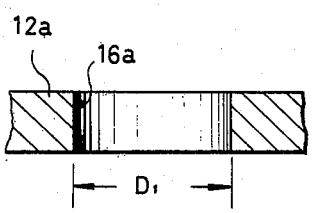
FIG. 5
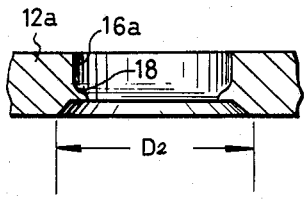
FIG. 6
FIG. 7
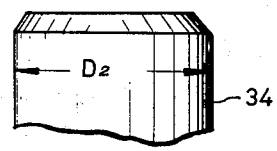
FIG. 8
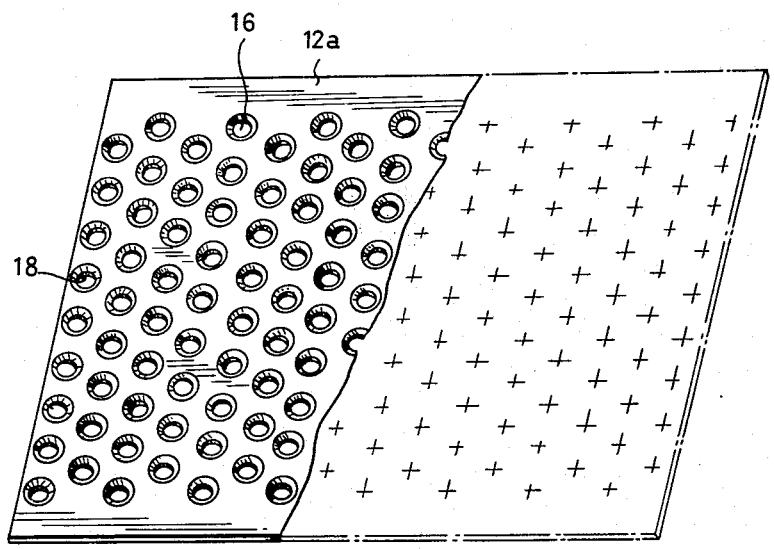

ROTARY MEMBER HOLDING ASSEMBLY

BACKGROUND OF THE INVENTION

This is a continuation-in-part application of Ser. No. 296,065 filed July 5, 1972, now abandoned.

This invention relates to a rotary member holding assembly, such as a ball bearing assembly for use in a die set or the like, and more particularly to a rotary member holding assembly which comprises a holding body made of brass or gun metal and which is provided with a plurality of through receiving holes each having retaining means for retaining a rotary member or ball rotatably received in the holes in such a manner that the rotary members will not fall out of the holes.

Heretofore, there have been proposed a number of ball bearing assemblies in which ball bearing retaining means are provided by bending punched areas adjacent to ball holding holes by means of a press. In such cases the holding body is required to have a substantial thickness sufficient to withstand severe stress inevitable in such a bending operation. Also the bending operation is not easily effected and especially the area adjacent to the hole cannot be bent uniformly, resulting in a variation in compression force. Therefore, these known conventional ball bearing assemblies are not suitable for mass production and have disadvantages with respect to the amount of production time required, the high cost, and other economic disadvantages.

The above and other disadvantages may be overcome according to the present invention by forming the holding body utilizing a plurality of relatively thin members and providing the holding body with ball retaining means which may be in the form of flanges or rings which are formed on the holding body at areas adjacent to the holes so as to protrude inwardly of the holes in a manner to hold and retain the balls within the holes and to prevent them from falling out. Therefore, according to the present invention, the holding body is not required to have a large thickness as heretofore thought necessary, and the holding body may be formed of a laminated structure which can be processed and manufactured very economically in accordance with mass production techniques. In addition the holding body, according to the present invention, may be made light in weight and uniform thereby resulting in a less expensive and a more economical rotary member holding assembly which is suitable for mass production.

Accordingly, an object of the present invention is to overcome the disadvantages of known prior art devices and to provide a rotary member holding assembly which may be made less expensively and which is adapted to be manufactured according to mass production techniques.

Another object of the present invention is to provide a rotary member holding assembly which exhibits high strength for retaining the rotary members in place and wherein the holding body is not required to have a large thickness.

Another object of the present invention is to provide a rotary member holding assembly which can be easily manufactured, which retains the rotary members in uniform position, and which has a long service life.

A further object of the present invention is to provide a rotary member holding assembly comprising a unitary holding body provided with a plurality of rotary member retaining means having a configuration which substantially conforms with the outer periphery of the rotary member retained therein and whereby a plurality of rotary members are rotatably received in the holes and protrude out of the sides of the holding body.

The above and other objects and attendant advantages of the present invention will be more readily apparent to those skilled in the arts from the reading of the following description in conjunction with the accompanying drawings which show preferred embodiments of the invention for illustrative purposes only but not for limiting the scope of the same in any way.

SUMMARY OF THE INVENTION

A rotary member holding assembly includes an inner cylindrical member having a plurality of spaced openings and an outer cylindrical member disposed in abutting relationship about the inner cylindrical member and also having a plurality of spaced openings generally aligned with the spaced openings in the inner cylindrical member. A plurality of rotary members are disposed in the aligned openings and retained in place by ball-retaining flanges concentrically disposed about the spaced openings in the outer cylindrical member and ball-retaining rings concentrically disposed within the spaced openings in the inner cylindrical member.

BRIEF DESCRIPTION OF THE DRAWINGS

FIG. 5 is a fragmentary sectional view on an enlarged scale, showing an intermediate step in manufacturing the inner cylindrical member of the rotary member bearing assembly and showing the inner cylindrical member as it appears before the retaining ring has been formed therein.

FIG. 6 is a fragmentary view of the inner cylindrical member showing a subsequent manufacturing step wherein a rotary member retaining ring has been formed therein.

FIg. 7 is a fragmentary view, on an enlarged scale, showing the punching tool head for forming the retaining ring shown in FIG. 6.

FIg. 8 is a partial perspective view of the inner cylindrical member as it appears during an intermediate manufacturing step and showing the openings and ball-retaining flanges formed on the flat plate before the latter is rolled into a cylinder.

DESCRIPTION OF THE PREFERRED EMBODIMENTS

Figure 1:
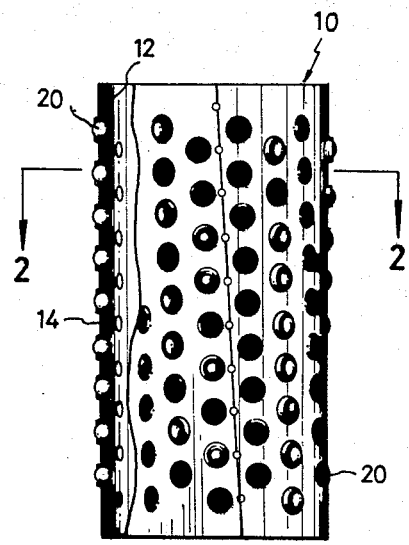
FIG. 1 is an elevational view, partially in section, of a rotary member bearing assembly according to one embodiment of the present invention.

The present invention will now be described referring to the accompanying drawings and more particular to FIGS. 1, 2, and 3 which show a preferred embodiment of a rotary member holding assembly in the form of a ball bearing assembly for use in a stroke bearing die set. The ball bearing assembly indicated generally at 10 includes an inner cylindrical member 12 and an outer cylindrical member 14 which are formed of a suitable metal such as brass or gun metal and which abut against each other along their length except for the areas which are provided with ball holding holes. The inner cylinder 12 is formed with a plurality of ball holding through holes 16 (FIG. 8) in suitable spaced relationship. The ball holding holes 16 are arranged in a plurality of rows extending at a slight angle relative to vertical and the adjacent rows are staggered from each other with one hole in one row being positioned intermediate the two adjacent holes in the adjacent row. Within each of the through holes 16 in the inner cylinder 12 there is provided a ballretaining ring 18 disposed intermediate the longitudinal ends of the through hole 16. The ball-retaining ring 18 serves to retain a ball bearing 20 in the through hole 16. It will be seen that the ball-retaining ring 18 has a diameter which is smaller than the largest diameter of the ball bearing 20 so that the retaining ring 18 is effective to retain the ball bearing 20 in place.

Similarly, the outer cylinder 14 is provided with a plurality of ball holding through holes 22 which are aligned with the respective associated through holes 16 in the inner cylinder 12. Each of these through holes 22 is surrounded by a protruding and curved ball-retaining flange 24. Each of the ball-retaining flanges 24 is concentrically disposed relative to its respective through holes 22 and extends radially inwardly of the through hole and also generally outwardly from the outer surface of the outer cylinder 14. Each of the ball-retaining flanges 24 is provided with a slight concavity, as can be shown in FIG. 3, so a to conform generally with the spherical surface of the ball 20 to be held in the through holes for allowing the balls 20 to freely rotate in the through holes as defined in part by the ball-retaining flange 24.

The inner and outer cylinder members 12 and 14 are secured together by suitable means such as by spot welding or the like to form a unitary structure with the balls being rotatably retained in place by the ball-retaining flanges 24 on the outer cylindrical member 14 and the retaining rings 18 on the inner cylindrical member 12. As shown in FIg. 3, the inner cylindrical member 12 has a thickness greater than the outer cylindrical member 14.

Figure 2:
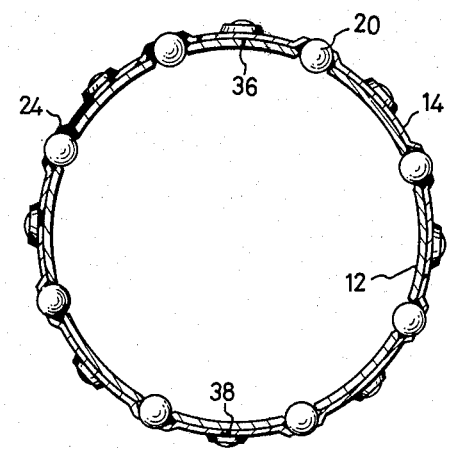
FIG. 2 is a transverse sectional view of the rotary member bearing assembly taken along the line 2—2 in FIG. 1.
Figure 3:
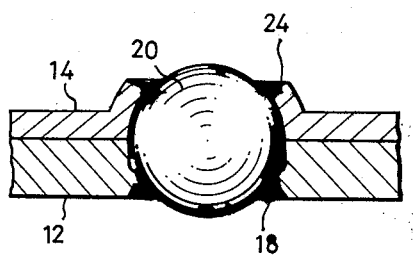
FIG. 3 is a fragmentary sectional view, on a larger scale, of one rotary member and adjacent parts of the rotary member bearing assembly shown in FIGS. 1 and 2.
Figure 4:
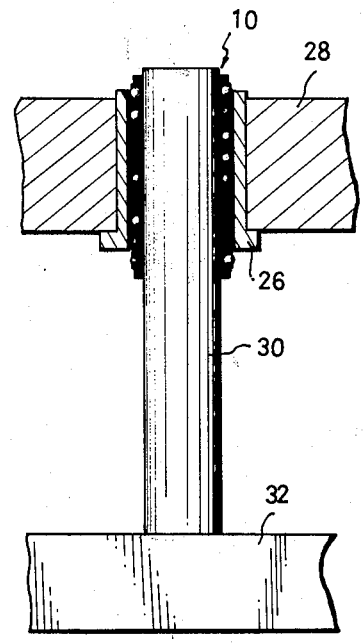
FIG. 4 is a partial sectional view of a die set in which the rotary member bearing assembly of FIGS. 1 to 3 is incorporated showing portions thereof in section and portions thereof broken away.

FIg. 3 shows a die set in which the ball bearing assembly 10 shown in FIGS. 1 to 3 is incorporated. The die set is fitted with a bushing 26 which is in turn fitted in the hole in a punch holder 28. The ball bearing assembly 10 is guided along a guide post 30 extending vertically of a die shoe 32 for stroke movement in the conventional manner.

Figure 9:
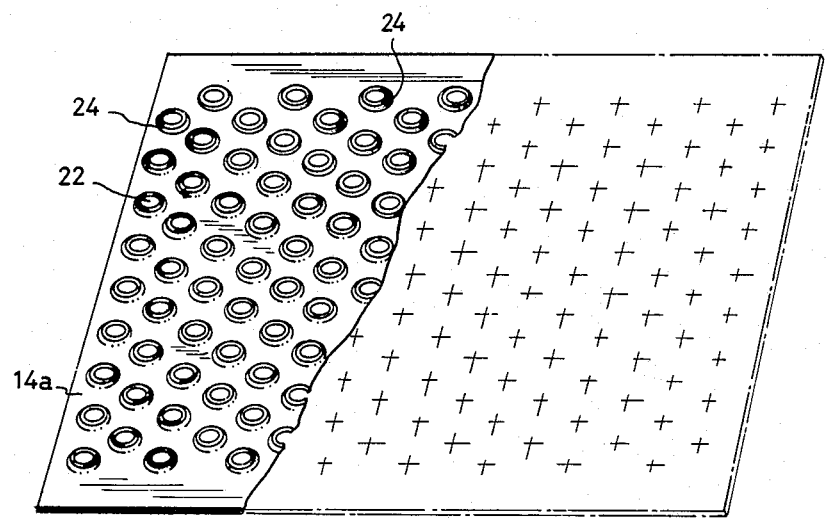
FIg. 9 is a partial perspective view of the outer cylindrical member as it appears during an intermediate manufacturing step and showing the openings and ball-retaining rings formed on the flat plate before the latter is rolled into a cylinder.

Having described the general overall structure and arrangement of the ball bearing assembly, a method of manufacture thereof will now be set forth. Turning first to the outer cylindrical member 14, the latter is initially in the configuration of a flat metal plate 14a as shown in FIG. 9 and the through holes 22 and ball-retaining flanges 24 are formed therein while the metal plate 14a is in a flat condition. Similarly, another thicker flat plate 12a (FIG. 8) is provided from which the inner cylindrical member 12 is to be formed. While in a flat condition, a plurality of through holes 16a are formed or punched in the plate 12a as shown in FIG. 5. These holes 16a generally have straight side walls with a diameter D1 as shown in FIG. 5. Thereafter, a punching tool head 34 having a diameter D2 greater than D1 as shown in FIG. 7 is pressed on one side of the cylindrical opening 16a whereby a portion of the metal at the cylindrical opening 16 is pushed or forced inwardly to form the ball-retaining ring 18 as shown in FIG. 6. As indicated heretofore, the inner diameter of the ball-retaining ring 18 is smaller than the diameter of the ball 20 to be retained therein, thereby preventing the ball 20 from passing therethrough.

The plates 12a and 14a may be in the form of parallelograms as shown in FIGS. 8 and 9 respectively so that when they are rolled into cylindrical form, as will be described hereinafter, the abutting seams are disposed at an acute angle relative to the respective longitudinal axes.

Figure 10:
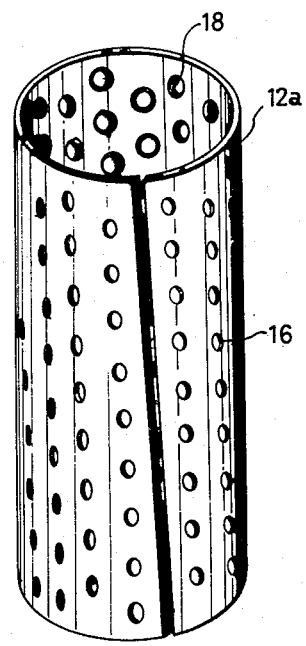
FIg. 10 is a perspective view of the inner cylindrical member after the latter has been formed into a cylinder.
Figure 11:
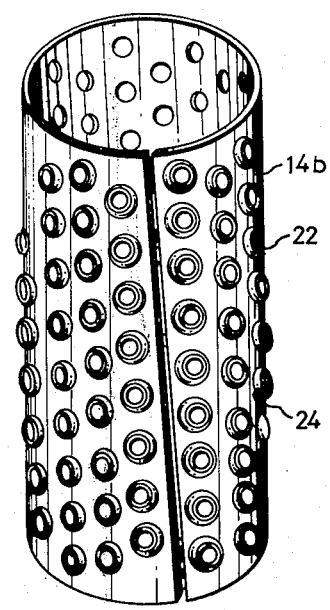
FIg. 11 is a perspective view of the outer cylindrical member after the latter has been formed into a cylinder.

After the holes 16a and ball-retaining rings 18 are formed on the flat plate 12a, the latter is wrapped or rolled into a cylinder 12b as shown in FIG. 10. The abutting ends of the cylinder 12b may be suitable joined to one another such as by spot welding or the like as indicated at 36 in FIG. 2. The individual ball bearings are then set or placed on the ball-retaining rings 18 of the through holes in the inner cylindrical member 12.

After the through holes 22 and ball-retaining flanges 24 are formed on the flat plate 14a, the latter is also rolled and formed into a cylinder 14b and covers over the bearing balls which have been set on the ball-retaining rings 18 in the inner cylindrical member 12 and here again, the abutting ends of the outer cylindrical member 14b are suitable secured to each other such as by spot welding or the like as indicated at 38 in FIG. 2.

By way of example the inner cylinder 12 may have a thickness of 0.5 to 1.2 mm and the outer cylinder 14 may have a thickness of 0.5 to 0.8 mm.

With a ball bearing assembly formed as described hereinabove, it is possible to produce a very strong and high intensity bearing assembly using two cylindrical members.

It will be noted that as compared with conventional rotary member holding assemblies of this general type, applicant's ball bearing assembly can be formed and assembled very readily while at the same time having a long service life and retaining the balls therein uniformly. In addition, the ball bearing assembly of the present invention can be produced at less expense and is adaptable and suitable for mass production.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A rotary member holding assembly comprising an inner cylindrical member having a plurality of spaced openings, an outer cylindrical member disposed in abutting relationship about said inner cylindrical member and having a plurality of spaced openings generally aligned with the spaced openings in said inner cylindrical member, a plurality of rotary members disposed in said aligned openings, said outer cylindrical member having ball-retaining flanges concentrically disposed about the spaced openings therein, said ball-retaining flanges project outwardly from the outer surface of said outer cylindrical member, said rotary members being spherical with said ball-retaining flange having a partial spherical configuration conforming generally to the spherical configuration of said rotary members, and said inner cylindrical member having ball-retaining rings concentrically disposed within said spaced openings therein.

2. A rotary member holding assembly according to claim 1 wherein each of said openings in said inner cylindrical member has a generally cylindrical wall, said ball-retaining ring extending generally radially inwardly from said cylindrical wall, said ball-retaining ring being located intermediate the longitudinal ends of said cylindrical wall.

3. A rotary member holding assembly according to claim 2 wherein said ball-retaining ring is disposed closer to the inner surface of said inner cylindrical member than to the outer surface thereof.

* * * * *